US007947950B2

(12) United States Patent
Enke et al.

(10) Patent No.: US 7,947,950 B2
(45) Date of Patent: May 24, 2011

(54) ENERGY FOCUS FOR DISTANCE OF FLIGHT MASS SPECTOMETRY WITH CONSTANT MOMENTUM ACCELERATION AND AN ION MIRROR

(75) Inventors: Christie G Enke, Placitas, NM (US); Gareth S Dobson, Burlingame, CA (US)

(73) Assignee: STC.UNM, Albuquerque, NM (US)

( * ) Notice: Subject to any disclaimer, the term of this patent is extended or adjusted under 35 U.S.C. 154(b) by 578 days.

(21) Appl. No.: 11/865,812

(22) Filed: Oct. 2, 2007

(65) Prior Publication Data

US 2008/0017792 A1 Jan. 24, 2008

Related U.S. Application Data

(63) Continuation-in-part of application No. 11/360,872, filed on Feb. 23, 2006, now Pat. No. 7,429,728, which is a continuation of application No. 10/804,968, filed on Mar. 18, 2004, now Pat. No. 7,041,968.

(60) Provisional application No. 60/848,745, filed on Oct. 2, 2006, provisional application No. 60/922,345, filed on Apr. 6, 2007, provisional application No. 60/456,269, filed on Mar. 20, 2003.

(51) Int. Cl.
*H01J 49/06* (2006.01)
*G01N 27/62* (2006.01)

(52) U.S. Cl. ........ 250/290; 250/281; 250/282; 250/288; 250/291

(58) Field of Classification Search .................. 250/282, 250/290
See application file for complete search history.

(56) References Cited

U.S. PATENT DOCUMENTS

| | | | | |
|---|---|---|---|---|
| 2,642,535 | A | 6/1953 | Schroeder | |
| 5,872,356 | A | 2/1999 | Fischer | |
| 6,528,784 | B1 | 3/2003 | Tang et al. | |
| 7,041,968 | B2 * | 5/2006 | Enke | 250/282 |
| 7,429,728 | B2 * | 9/2008 | Enke | 250/282 |
| 2005/0040326 | A1 * | 2/2005 | Enke | 250/288 |
| 2006/0138318 | A1 * | 6/2006 | Enke | 250/287 |
| 2008/0017792 | A1 * | 1/2008 | Enke et al. | 250/287 |

FOREIGN PATENT DOCUMENTS

| | | | |
|---|---|---|---|
| DE | 4308299 | A1 | 9/1994 |
| JP | 2000-516762 | A | 12/2000 |
| JP | 2001-307675 | A | 11/2001 |
| JP | 2002-83565 | A | 3/2002 |
| WO | WO8304187 | A1 | 12/1983 |
| WO | 98/07178 | A1 | 2/1998 |
| WO | WO9939368 | A2 | 5/1999 |

* cited by examiner

*Primary Examiner* — David A Vanore
(74) *Attorney, Agent, or Firm* — Gonzales Patent Services; Ellen Gonzales

(57) ABSTRACT

A distance-of-flight mass spectrometer (DOF-MS) imparts constant momentum acceleration to ions in an ion source and uses an ion mirror to enhance energy focusing. Embodiments of DOF-MS with ion mirror are shown. Further, a method of compensating for the dispersion of initial ion position and velocity in the ion source is discussed.

19 Claims, 4 Drawing Sheets

ENERGY FOCUS FOR DISTANCE OF FLIGHT MASS SPECTOMETRY WITH CONSTANT MOMENTUM ACCELERATION AND AN ION MIRROR

PRIORITY CLAIM

The following application is a continuation-in-part of U.S. patent application Ser. No. 11/360,872, filed Feb. 23, 2006, which is a continuation of U.S. patent application Ser. No. 10/804,968, now U.S. Pat. No. 7,041,968, filed May 18, 2004, which claims priority to U.S. Provisional Patent Application No. 60/456,269, filed May 20, 2003. The following application also claims priority to U.S. Provisional Patent Applications No. 60/848,745, entitled "Method of Focusing Ions for Distance of Flight Mass Spectrometry" filed Oct. 2, 2006, and No. 60/922,345, entitled "Distance of Flight Mass Spectrometer" filed Apr. 6, 2007, each of which is hereby incorporated by reference.

TECHNICAL FIELD

This invention generally relates to mass spectrometers and more particularly to distance-of-flight mass spectrometers (DOF-MS).

BACKGROUND

If it were possible to give ions a mass-dependent velocity, and then start all the ions on their way at the same time from the same place with the same impetus, the ions would spread out along the flight path according to their velocity, the faster ones advancing over the slower ones. This simple concept is the basis of time-of-flight mass spectrometry where a detector is placed at the end of the flight path and the detector response is recorded as a function of the time elapsed since the ion packet's release from the ion source. Peaks in detector response occur as ions of increasing mass-to-charge ratio (m/z) arrive at the detector where the roman m indicates mass in atomic mass units. Interpretation of the arrival time in terms of the m/z value gives the relative abundance of ions of all m/z values in the original ion packet.

Time-of-flight (TOF) has been pursued as the basis for mass spectrometers since the 1940s. The usual method of ion acceleration in TOF instruments is constant energy. However, a TOF mass spectrometer using constant momentum acceleration was built by Wolff and Stevens in 1953 (Wolff, M. M.; Stephens, W. E. *Rev. Sci. Instr.* 1953, 24, 616-617). Limitations in achievable resolution and the speed of available detection electronics made TOF mass spectrometry uncompetitive with instruments based on the emerging quadrupole mass filters. Now, due to improvements in both the previously limiting elements, TOF mass spectrometry has become the method of choice for many applications. Its principal advantages over other methods of mass analysis are its ability to produce full spectra for each ion packet and to do so at a very high rate of spectral generation. Since the flight times in TOF-mass spectrometry are very short (on the order of 100 μs or less) the electronics for recording ion arrival times and the ion abundance at each time can be expensive and can also be the limiting factor in dynamic range and maximum ion detection rate.

Distance-of flight (DOF) is another possible approach to the application of m/z-dependent velocity for mass analysis. In this approach, one would release the ions from the source with m/z dependent velocities and then, at a specific time after release from the source, determine the number of ions at each unit of distance along the flight path. To use a chromatographic analogy, TOF-MS is to column chromatography what DOF-MS is to thin-layer chromatography. DOF-MS retains the advantages of TOF-MS mentioned above but substitutes an array of non-time-dependent detectors for a single high-speed detection system. Array detectors have the advantage of allowing signal accumulation within each element over many ion packet releases for improved dynamic range and signal-to-noise ratio. They also avoid the need for high-speed electronics as the m/z assignment is made by the element at which the ion is detected, not the time of its detection. For all applications requiring the high quantitative precision of Faraday cup detectors, array detection geometry allows multiple parallel detection.

The use of an array of detectors in which ions of different m/z values fall on different detectors requires a spatial m/z dispersive device. The most often used device is the Mattauch-Herzog mass spectrograph (Sinha, M. P., Wadsworth, M. *Rev. Sci. Instr.* 2005, 76, 1-8; Barnes, J. H. IV, Schilling, G. D., Sperline, R., Denton, M. B., Young, E. T., Barinaga, C. J., Koppenaal, D. W., and Hieftje, G. M. *Anal. Chem.* 2004, 76, 2531-2536; Schilling, G. D., Andrade, F. J., Barnes, J. H. IV, Sperline, R. P., Denton, M. B., Barinaga, C. J., Koppenaal, D. W., and Hieftje, G. M. *Anal. Chem.* 2006, 78, 4319-4325). Array detectors have not been previously employed in mass spectrometry in systems depending on the relative flight distance of ions with m/z-dependent velocities in the same packet. A totally different approach is found in U.S. patent application US2004/0206899 A1 by Webb. et al. in which ions of various m/z in a packet are given the same velocity and then sorted according to their different energies onto an array detector.

Time-of-flight mass spectrometers are not as simple as the above discussion implies, due largely to the fact that all the ions of the same m/z value do not start from the same place or with the same velocity and thus do not arrive at the detector at the same time. Methods to compensate for this dispersion of initial space and velocity have been the object of a great deal of study since TOF-MS was first developed. The same problems beset DOF-MS, but the same solutions are not suitable.

SUMMARY OF THE INVENTION

In one aspect of the present invention, a mass spectrometer includes an ion source configured to apply an acceleration pulse to ions, a field-free region through which ions can travel, a detector array configured to detect ions, a push plate oriented substantially parallel to the array of detectors and configured to push the ions to the detector array, and an ion mirror configured to reflect ions.

In another aspect, a method of focusing ions is provided. The method includes applying constant momentum acceleration within an ion source for extraction, extracting the ions, sending the ions to an ion mirror configured to reflect ions, allowing the ions to traverse a field-free region, and, at a specific time relative to the ion extraction, applying a voltage to a push plate in the field-free region to push the ions to a detector array.

In yet another aspect, a method of ion focusing including, in a distance-of-flight mass spectrometer with an ion mirror, compensating for the dispersion of initial ion position and velocity by varying an acceleration pulse voltage and a pulse width applied to ions in the ion source, wherein energy focus resolution of the ions is improved by applying an appropriate acceleration pulse voltage and a corresponding pulse width.

DETAILED DESCRIPTION

Figure 1A:
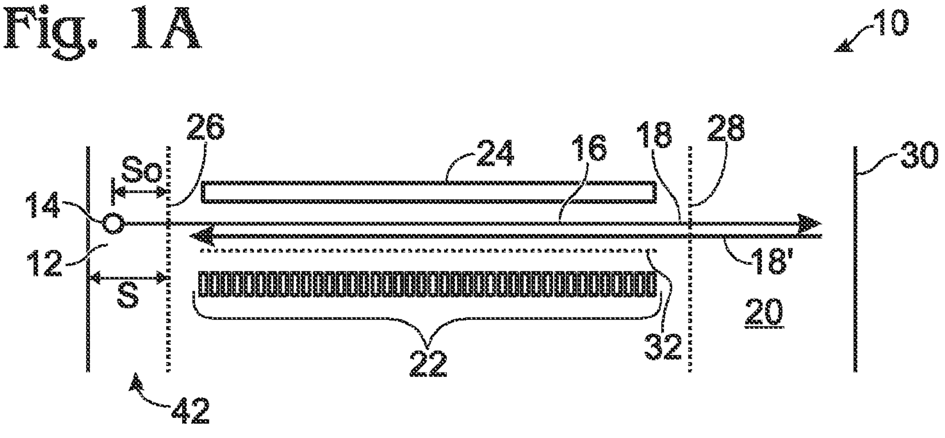
FIG. 1A is a schematic of a distance-of-flight mass spectrometer (DOF-MS) in accordance to one embodiment of the present invention.

In one or more embodiments, the present invention provides an apparatus for distance-of-flight mass spectrometer (DOF-MS) and methods of achieving energy focus. Two modes of expelling ions from an ion source—1) constant energy and 2) constant momentum—are described with reference to time-of-flight mass spectrometers (TOF-MS) and distance-of-flight mass spectrometers (DOF-MS), with and without an ion mirror.

Constant Energy Extraction

The principal arguments regarding achievement of ion focus with constant energy extraction as developed by Robert J. Cotter in Time-of-Flight Mass Spectrometry (American Chemical Society, Washington, DC 1997; now distributed by Oxford University Press) are repeated here to show the contrast between ion focusing for time-of-flight and for distance-of-flight and between constant energy and constant momentum extraction.

In constant energy extraction, the ions in the source are subjected to a sudden imposition of a constant electric field strength which impels them toward the source exit. They remain subject to this field throughout their time in the source. Ions with the same axial position and initial kinetic energy will leave the source with the same kinetic energy, which in terms of electron volts, is simply the axial field strength times the ion's unit charge and the distance it traversed to the source exit. Ions with an initial kinetic energy toward the source exit will leave the source earlier and with a higher kinetic energy than those with no initial kinetic energy. An ion initially moving away from the source exit will decelerate to zero kinetic energy, then reaccelerate toward the source. When it returns to its initial position, it will have the same kinetic energy it had going backwards, but it will leave the source later than if its initial motion were forward. This delay is called the turn-around time. The turn-around delay increases with ion mass-to-charge ratio and decreases with the magnitude of the applied field.

Note also that ions with no axial kinetic energy will have the least kinetic energy leaving the source; even though the reverse moving ions leave the source later, they do so with the absolute value of their initial kinetic energy added to the energy imparted by the extraction field.

The initial spatial dispersion of ions results in a difference in the time, velocity, and energy with which the ions depart the source. Ions beginning further from the source exit gain more energy on extraction, but will leave the source later than those starting from a more forward position. Assume that the ions begin at a position $s_o$ meters away from the exit of a source of depth s with an axial voltage $V_s$ across the source. The initial spatial spread is $\Delta s_o$ either side of $s_o$ so the initial ion distance from the source exit is $(s_o+\Delta s_o)$ meters where a positive value of $\Delta s_o$ indicates an initial position toward the back of the source relative to $s_o$. The time of ions leaving the source given an initial spatial distribution is $$t_{s(ce)} = \left(\frac{2(s_o + \Delta s_o)m}{E_s z q_e}\right)^{1/2} \quad (1)$$

where z is the multiple of $q_e$ positive electron charges on the ion, m (italics) is the ion mass in kg, and $E_s$ is the extraction field strength ($V_s$/s).

The velocity $v_{(ce)}$ of the ions leaving the source, in meters per second is $$v_{(ce)} = \left(\frac{2(s_o + \Delta s_o)E_s z q_e}{m}\right)^{1/2} \quad (2)$$

so even though the more rearward ions leave the source later, they have a higher velocity. Eventually, the rearward ions catch up with the forward ions at a place called the space focus plane (Wiley, W. C.; McLaren, I. H. Rev. Sci. Instr. 1955, 26, 1150-1157). The position of the space focus plane (SFP) is twice the distance between the center of the ion packet and the source exit. It is of interest that the position of the space focus plane is independent of ion mass and extraction field strength. The time the ions arrive at the space focus plane is twice their exit time from the source.

$$t_{SEP} = 2\left(\frac{2s_o m}{E_s z q_e}\right)^{1/2} \quad (3)$$

Though the ions are in temporal focus at the space focus plane and $t_{SFP}$ is m/z-dependent, they have not flown a sufficient distance for their m/z-dependent velocities to produce a useful time difference among ions of different m/z values.

Two methods are used to increase the flight distance while retaining the spatial focus of the space focus plane. One is the two-field source in which the ions are accelerated by the field strength $E_0$ in the first source region and then by a higher field strength $E_1$ in the second region. If the length of the second acceleration region and the distance the ions travel in the first region are equal, the distance to the space focus plane is increased approximately by the factor $(1+E_1/E_0)$. There is a practical limitation to this solution because if the field strength in the source is high enough to reduce the turn-around to an acceptable level, the field strength in the second field must be many times higher in order to achieve a sufficient distance to the space focus plane. This leads to ion kinetic energies in the tens of kilovolts and very short flight times.

The second, now almost universally applied solution to temporal focus with constant energy ion extraction is the ion mirror (Mamyrin, B. A.; *Int. J. Mass Spectrom. Ion Processes* 1994, 131, 1-19). It employs a decelerating field of sufficient total voltage so that the ions stop, turn around, and then return to exit at the mirror entrance. Since ions with a higher energy will penetrate further into the mirror, the ion flight time in the mirror increases with increasing ion energy. First-order temporal focus is obtained when the increased time in the mirror for ions with higher kinetic energy is balanced by their decreased time in the field-free regions before and after the mirror element. For a mirror with a constant electric field strength, first-order focus is achieved when the field free flight distance is four times the distance to which the ions penetrate the mirror field. In optical terms, the temporal focus at the space focus plane is imaged at the focal point of the mirror. For this reason, the ion mirror is often referred to as an energy focusing device and is therefore used with sources employing constant energy extraction. However, we must remember that it is not the initial ion energy dispersion that is being focused, but rather the energy dispersion caused by the initial spatial dispersion. Therefore, it is actually the spatial dispersion that has been focused by the combination of constant energy extraction and the ion mirror.

From the above discussion, we see that the initial spatial dispersion of the ions is corrected at the space focus plane and at its image formed by the mirror after a longer flight path for improved separation. The turn-around time problem is not corrected as the rearward moving ions will lag the forward moving ions (of the same initial kinetic energy) by the same amount throughout the ion flight. The turn-around time can only be minimized by the use of higher source extraction fields (inviting greater second order spatial defocusing) and/or longer flight paths.

The space-focus plane that is the direct result of constant energy extraction is not advantageous for distance-of-flight mass spectrometry. Ions converge at a specific distance at m/z-dependent times at the space focus plane while for DOF-MS, it is desired to have ions converge at the same time at m/z-dependent distances. From this fact we conclude that constant energy extraction is not well suited to DOF-MS and our attention now turns to constant momentum extraction.

Constant Momentum Extraction

Constant momentum extraction is achieved by the application of an acceleration field for a time less than that required for the ion to exit the source. This will generally require application of an acceleration field on the microsecond time scale. Constant momentum extraction has been known for many years. Poschenroeder has shown that energy focusing for TOF analyzers is achievable with a combination of constant momentum acceleration and magnetic sectors (*Int. J. Mass Spectrom. Ion Phys.* 1971, 6, 413), and Ioanoviciu has published theoretical analyses of constant momentum acceleration for TOF in conjunction with hyperbolic electrode ion sources (*Rapid Commun. Mass Spectrom.* 1998, 12, 1925-1927) and an ion mirror with delayed extraction (*Nuclear Instr. Methods in Phys. Res. A,* 1999, 427, 157-160). To date, no commercial analytical mass spectrometers employ constant momentum acceleration. More recently, Barofsky et al. have proposed constant momentum acceleration in conjunction with a non-linear extraction field to enhance ion selection in time-of-flight instrumentation (Santacruz, C. P., Hakansson, P., Barofsky, D. F., and Piyadasa, C. K. G. *J Am Soc Mass Spectrom.* 2007, 18, 92-101). As the following arguments show, constant momentum acceleration is advantageous for array detection by DOF-MS.

A pulse of voltage $V_p$ is applied across the source of depth s for a short time τ to give a field strength in the source of $$E_p = \frac{V_p}{s} \tag{4}$$

The force on the ions during the pulse is $$\begin{aligned} f &= E_p z q_e \\ &= ma \\ &= m\frac{dv}{dt} \end{aligned} \tag{5}$$

where z is the multiple of $q_e$ positive electron charges on the ion, v is the ion velocity in meters per second, and m is the ion mass in kg. Integrating equation (5) from time 0 to τ and from the initial velocity $v_o$ to the final velocity $v_p$, $$E_p\tau = \frac{m}{zq_e}(v_p - v_o) \text{ and } v_p = \frac{zq_eE_p\tau}{m} + v_o \tag{6}$$

If the initial velocity $v_o$ is zero, the velocity gained by the voltage impulse, $v_{imp}$, is $$v_{imp} = \frac{zq_eE_p\tau}{m} \tag{7}$$

from which we see that the acceleration imparts a momentum (mv) to the ions that is proportional to the ion charge but independent of the ion mass. The resulting ion velocities are inversely proportional to their mass-to-charge ratios. To the imparted velocity change, the initial velocity is simply added.

The initial ion velocity $v_o$ is obtained from $$U_o = \frac{1}{2}mv_o^2 \tag{8}$$

where $U_o$ is the initial ion kinetic energy in joules.

For an analysis of the ion flight after leaving the source, it is necessary to derive equations for the ion momentum and kinetic energy at the cessation of the acceleration pulse as well as the time the ions leave the source. Assume that the ions begin at a position $s_o$ meters away from the exit of the source. The initial spatial spread is $\Delta s_o$ either side of $s_o$ so the initial ion distance from the source exit is $(s_o+\Delta s_o)$ meters where a positive value of $\Delta s_o$ indicates an initial position toward the back of the source relative to $s_o$. The initial ion energy is $(0+U_o)$ joules. A positive $U_o$ indicates initial motion toward the source exit.

The kinetic energy of the ions at the end of the pulse is $$\begin{aligned} ke_p &= \frac{m}{2}v_p^2 \\ &= \frac{m}{2}\left(\frac{zq_eE_p\tau}{m} + v_o\right)^2 \\ &= \frac{(E_p\tau)^2(zq_e)^2}{2m} + zq_eE_p\tau v_o + \frac{m}{2}v_o^2 \end{aligned} \tag{9}$$

The momentum of the ions at the end of the pulse is $$(mv)_p = m\left(\frac{zq_eE_p\tau}{m} + v_o\right) = zq_eE_p\tau + mv_o \tag{10}$$

From this equation it is clear that even though this ion extraction process is called "constant momentum acceleration", the momentum gained is proportional to the ion charge.

The average velocity gained by the ions during the pulse is half the final velocity gained, so the average ion velocity during the pulse is $$\overline{v}_p = \frac{zq_eE_p\tau}{2m} + v_o \tag{11}$$

The distance of the ions from the source exit at the end of the pulse is $$s_p = s_o + \Delta s_o - \tau\overline{v}_p \text{ for } s_p \geqq 0 \tag{12}$$

The ions now pass through the remainder of the source and into the field-free region with the velocities, momenta, and kinetic energies they had at the end of the pulse.

The time required for the extraction of an ion from the source, $t_e$, after the pulse is $$t_e = \frac{s_p}{v_p} \tag{13}$$

The total time for the ions to reach the source exit from the beginning of the acceleration pulse is $$t_s = \tau + t_e = \tau + \frac{s_p}{v_p} = \frac{s_o + \Delta s_o}{v_p} + \tau\left(1 - \frac{\overline{v}_p}{v_p}\right) \tag{14}$$

When substitutions for $v_p$ and $\overline{v}_p$ are made in Equation (14) from Equations (6) and (11), $$t_s = \frac{s_o + \Delta s_o}{\frac{zq_eE_p\tau}{m} + v_o} + \frac{\tau^2}{2\tau + 2mv_o/zq_eE_p} \tag{15}$$

The second term in Equation (15) will approach half the pulse width as $v_o$ approaches zero. The term $2mv_o/zq_eE_p$ in the denominator of the second term in Equation (15) is equal to the ion turn-around time as shown below.

The turn-around time of ions during the pulse is equal to 2 times the length of pulse required to stop the backward moving ions. Equation (6) is solved for $\tau_{stop}$ by setting the value of $v_p$ at $\tau_{stop}$ to 0 and assuming a negative value of $v_o$.

$$v_o = \frac{zq_eE_p\tau_{stop}}{m},\ \tau_{stop} = \frac{mv_o}{zq_eE_p},\ \Delta t_{\pm U_o} = 2\tau_{stop} = \frac{2mv_o}{zq_eE_p} \tag{16}$$

from which we see that the turn-around time is directly proportional to the initial ion momentum in the reverse direction and is inversely proportional to its charge. The effect of the turn-around time on the time at which the ions exit the source, as shown in Equation (15), depends on the magnitude of the turn-around time relative to the pulse width.

Another way to express Equation (15) is $$t_s = \frac{s_o + \Delta s_o}{\frac{zq_eE_p\tau}{m} + v_o} + \frac{\tau}{2}\left(\frac{1}{1 + mv_o/zq_eE_p\tau}\right) = \frac{s_o + \Delta s_o}{v_{imp} + v_o} + \frac{\tau}{2} - \frac{\tau}{2}\left(\frac{v_o}{v_{imp} + v_o}\right) \tag{17}$$

which indicates that the effect of the initial velocity on the source exit time decreases as the initial velocity decreases in proportion to the imparted velocity. In any case, its effect on the exit time from the source will be some small fraction of half the pulse width.

The turn-around phenomenon is different in constant momentum and constant energy acceleration. In the constant energy case, ions with the same kinetic energy in opposite directions emerge from the source with the absolute value of their axial kinetic energy added to that imparted by the extraction field, but the ion with reverse motion is delayed by the turn-around time. In the constant momentum case, once an ion has turned around, there is only a part of the momentum pulse remaining for its forward acceleration. Thus, the backward-moving ion receives less forward momentum than the forward-moving ion by two times the amount of their initial momenta. Therefore, in addition to the turn-around delay, the velocity of the reverse ion leaving the source will be less than that of its forward-moving counterpart. If $\tau$ is not greater than $\tau_{stop}$, the ion will not leave the source in the forward direction at all.

The turn-around time in constant momentum acceleration can be reduced by using a higher extraction field strength. However, to impart the same average momentum to the ions, the pulse width would be reduced by the same factor with which the field strength is increased. The relative momentum variation due to the differences in initial kinetic energy, can only be reduced by increasing the total imparted momentum.

Time-of-Flight Detection with Constant Momentum Extraction

Consider that the length of the field free flight path from the source exit to a TOF detector is $L_{FF}$. The time the ions are in the field-free region is $$t_{FF} = \frac{L_{FF}}{v_p} = \frac{L_{FF}}{v_{imp} + v_o} \tag{18}$$

The time at which the ions are detected $t_{det}$ is the sum of $t_s$ and $t_{FF}$.

$$t_{det} = \frac{L_{FF} + (s_o + \Delta s_o)}{v_{imp} + v_o} + \frac{\tau}{2} - \frac{\tau}{2}\left(\frac{v_o}{v_{imp} + v_o}\right) \tag{19}$$

If all the ions started with zero kinetic energy ($v_o$=0) and Equation (7) is used for $v_{imp}$, $$t_{det} = \frac{m}{zq_e}\left(\frac{L_{FF} + (s_o + \Delta s_o)}{E_p\tau}\right) + \frac{\tau}{2} \quad (\text{for } v_o = 0) \tag{20}$$

From this we see that the detect time is proportional to m/z so that the mass scale is linear with time. We can also see that the quantity $\Delta s_o$ is additive in the numerator so that the defocusing due to spatial dispersion will be roughly equal to the fraction that $2\Delta s_o$ is of $L_{FF}$. That is to say, the absolute spatial dispersion remains constant throughout the flight path but the separation of ion packets of different m/z increases with increasing flight path.

The defocusing due to the initial ion kinetic energy is potentially a worse problem. Consider ions with an atomic mass of 500 amu and a charge of 1, an initial kinetic energy of ±0.1 eV, accelerated from a source that is 10 mm in depth with a 200 V extraction pulse of one microsecond duration. For such ions, the value of the ion velocity due to the pulse is 3,859 m/s and that due to the ion kinetic energy is 196 m/s. This will result in a velocity variation of ±2% and a corresponding variation in ion detection time. This can be reduced by increasing the amplitude or duration of the momentum pulse, but there are practical limits that are small factors greater than the example calculated. On the other hand, the last term of Equation (19) is only 0.05 microseconds indicating that the dispersion due to turn-around is relatively minor.

Distance-of-Flight Detection with an Array Detector

The equations developed above govern distance-of-flight as well as time-of-flight except that the time of detection is a single value for all ions and the distance flown $L_{FF}$ is the m/z-dependent variable.

Rearranging Equation (20) in which it was assumed that there were no initial variations in ion energy, $$L_{FF} = \frac{zq_eE_p\tau}{m}\left(t_{det} - \frac{\tau}{2}\right) - (s_o + \Delta s_o) \text{ (for } v_o = 0) \tag{21}$$

From which we see that the distance flown is inversely proportional to the m/z of the ion and directly proportional to $E_p\tau$.

Rearranging Equation (19) which includes $v_o$, $$L_{FF} = \left(t_{det} - \frac{\tau}{2}\right)(v_{imp} + v_o) + \frac{\tau v_o}{2} - (s_o + \Delta s_o) \tag{22}$$

we see that the effect of the initial kinetic energy of the ions appears principally in the difference in ion velocity in the field-free region shown in the first term. Since the acceleration pulse width is very much smaller than the detection time, the effect of the second term is much smaller. The effects of differences in the starting position of the ions is maintained throughout the flight so that a 1 mm initial focus of ions would produce a 1 mm longitudinal packet dimension the entire flight path if spatial dispersion were the only factor. From this it can be concluded that an advantage of constant momentum acceleration would be that a very high field pulse can be used to induce a quick ion turn-around without introducing the correspondingly large energy dispersion that such a high field extraction produces in constant energy extraction of spatially disperse ions. However, the appearance of the initial energy dispersion as a velocity dispersion in the flight path is a problem as it affects the ion velocity throughout the field-free region and thus the distance flown in a given time.

In the next three sections, an ion mirror is introduced into the flight path and the resulting relationships between m/z and flight time for TOF-MS and flight distance for DOF-MS are analyzed.

Relationship between Time in the Mirror and Ion Momentum

A linear field ion mirror has a constant field strength from its entrance grid at the field-free region potential to its back $L_M$ meters behind the entrance grid. The voltage at the back is $V_M$ volts above that of the entrance grid. The field strength $E_M$ in the mirror is $V_M/L_M$.

Ions enter the mirror with kinetic energies, momenta, and velocities of $ke_p$, $(mv)_p$, $v_p$ and, ignoring the time in a field-free region between the source and the mirror, at time $t_s$. They will fly to a depth d within the mirror where they turn around and exit the mirror with the same energies, momenta, and velocities with which they entered. The factor of interest is the time the ions spend in the mirror $t_M$. Their average velocity in the mirror to d is $v_p/2$ which is also their average velocity between the turn-around point and the mirror exit. So their total flight distance in the mirror is 2d at an average velocity of $v_p/2$. Thus, $$t_M = \frac{4d}{v_p} \tag{23}$$

The value of d is where the mirror field voltage equals the kinetic energy of the ions over their charge so $$d = \frac{ke_p}{E_M zq_e} = \frac{mv_p^2}{2zq_eE_M} \tag{24}$$

Combining Equations (23) and (24), $$t_M = \frac{2mv_p}{zq_eE_M} \tag{25}$$

from which we see that the time an ion spends in the mirror is directly proportional to its momentum and inversely proportional to its charge. Since, to a first approximation, the momenta of all ions receiving constant momentum acceleration is independent of their mass and proportional to their charge, their times in the mirror would be approximately independent of their m/z. This is demonstrated by the substitution of $v_{imp}$ for $v_p$ in Equation (25) to calculate the mirror time for an ion with zero initial kinetic energy.

$$t_M = \frac{2E_p\tau}{E_M} \text{ (for } v_o = 0) \tag{26}$$

Time of Flight using Constant Momentum Extraction and a Linear-Field Ion Mirror

It seems possible that the extra time ions with a higher momentum spend in the mirror could compensate for the decreased time they spend in the field-free region.

The ion velocity is given by Equation (6). When this is substituted into Equation (25), $$t_M = \frac{2m}{zq_eE_M}\left(\frac{zq_eE_p\tau}{m} + v_o\right) = \frac{2(zq_eE_p\tau + mv_o)}{zq_eE_M} \tag{27}$$

two terms appear within the parentheses in the numerator; the first term is the normal time in the mirror and the second term is the difference in mirror time as a result of having a non-zero value of $v_o$. Again notice that the initial spatial dispersion does not appear in this equation.

The total flight time out of the source, through the mirror and the total field-free length is the sum of $t_s$. $t_{FF}$, and $t_M$ (Equations (19) and (27)).

$$t_{det} = \frac{L_{FF} + (s_o + \Delta s_o)}{v_{imp} + v_o} + \frac{\tau}{2}\left(1 - \frac{v_o}{v_{imp} v_o}\right) + \frac{2m}{zq_e E_M}(v_{imp} + v_o) \tag{28}$$

If $v_o$ is zero, $$t_{det} = \frac{L_{FF} + (s_o + \Delta s_o)}{v_{imp}} + \frac{\tau}{2} + \frac{2mv_{imp}}{zq_e E_M} \text{ (for } v_o = 0) \tag{29}$$

and if Equation (7) used for $v_{imp}$, $$t_{det} = \frac{m}{zq_e}\left(\frac{L_{FF} + (s_o + \Delta s_o)}{E_p \tau}\right) + \frac{\tau}{2} + \frac{2E_p \tau}{E_M} \text{ (for } v_o = 0) \tag{30}$$

we see that the mirror adds a constant amount of flight time, but does not alter the difference in flight times of ions with different values of m/z. Therefore, the mirror does not aid in m/z dispersion in flight time. We will next explore the possibility that the mirror does aid in the energy or space focus of ions of the same m/z.

The difference in the time an ion with initial velocity $v_o$ and one with $v_o$=0 spends through the flight path is (subtracting Equation (28) from Equation (29))

$$\Delta t_{det} = \frac{v_o(L_{FF} + s_o + \Delta s_o)}{v_{imp}(v_{imp} + v_o)} + \frac{\tau}{2}\left(\frac{v_o}{v_{imp} + v_o}\right) - \frac{2mv_o}{zq_e E_M} \tag{31}$$

When this difference is set to zero and solved for $L_{FF}$, $$L_{FF(efoc)} = v_{imp}\left(\frac{2m}{zq_e E_M}(v_{imp} + v_o) + \frac{\tau}{2}\right) - (s_o + \Delta s_o) \tag{32}$$

we find the flight distance $L_{FF(efoc)}$ at which energy focus is achieved.

Since there is one detector for time-of-flight and it is placed at $L_{FF(efoc)}$, it is desirable that this distance not be a function of m/z. Unfortunately, we see from Equation (32) that both terms in the equation for the focal distance are m/z dependent (because both $v_{imp}$ and $v_o$ are mass dependent). Thus, there is not, for this geometry, a "space focus plane" as there is for constant energy time-of-flight. On the other hand, exactly because the focal distance is a function of m/z, this geometry is a good candidate for distance-of-flight as we show in the next section.

Distance of Flight using Constant Momentum Extraction and a Linear-Field Ion Mirror Referring to FIG. 1A, a schematic of a DOF-MS in accordance to one embodiment of the present invention is shown at 10. This embodiment includes a source region 12 in which ions 14 are emitted into a field-free region 16 where the ions follow a typical flight path 18 to reach an ion mirror 20. The ions 14 are then reflected from the ion mirror 20 and retraverse the field-free region 16 (flight path labeled 18'), where at a detect time, they are pushed to a detector array 22 by a push plate 24. Inputting the configuration and parameters into SIMION for numerical integration, simulations were generated and the results discussed below.

In one embodiment, the DOF-MS runs in batch mode similar to TOF-MS. The ions produced by any ionization method such as electrospray ionization (ESI), desorption electrospray ionization (DESI), electron impact (EI), matrix-assisted laser desorption/ionization (MALDI) may have been previously bunched by collision cooling within quadrupole or linear ion traps. Alternatively, ionization methods that inherently produce ion bunches such as Laser Desorption (LD) or matrix-assisted laser desorption/ionization (MALDI) may be used without imposing an additional bunching device. It is understood that combinations of ionization, ion transfer, and bunching techniques may be used to enhance the information obtained in the resulting mass spectra.

The source region 12, also referred to as "ion source", includes a source exit 26 where the ion leaves the ion source, a source depth of s, and an ion beginning position $s_o$ referenced to the source exit 26. Prior to exiting the ion source, the ions may be imparted with an acceleration pulse for constant momentum extraction, as will be further described below.

The ion mirror 18 includes a front entrance grid 28 where the field-free region ends, a back 30 where a voltage $V_M$ may be applied, and a mirror depth $L_M$ extending from the front entrance grid to the back. The voltage is applied to the back of the ion mirror relative to the entrance to create a decelerating field, which is applied to the ions when they enter. It may be noted that an ion mirror may be any feasible energy focusing device. In the examples shown, the ion mirror is configured to reflect the ions 14 back with a 180° reflectance. It is understood that ion mirrors are commonly applied with various angles of reflectance and instruments with angled reflectance geometries could be devised.

Figure 9:
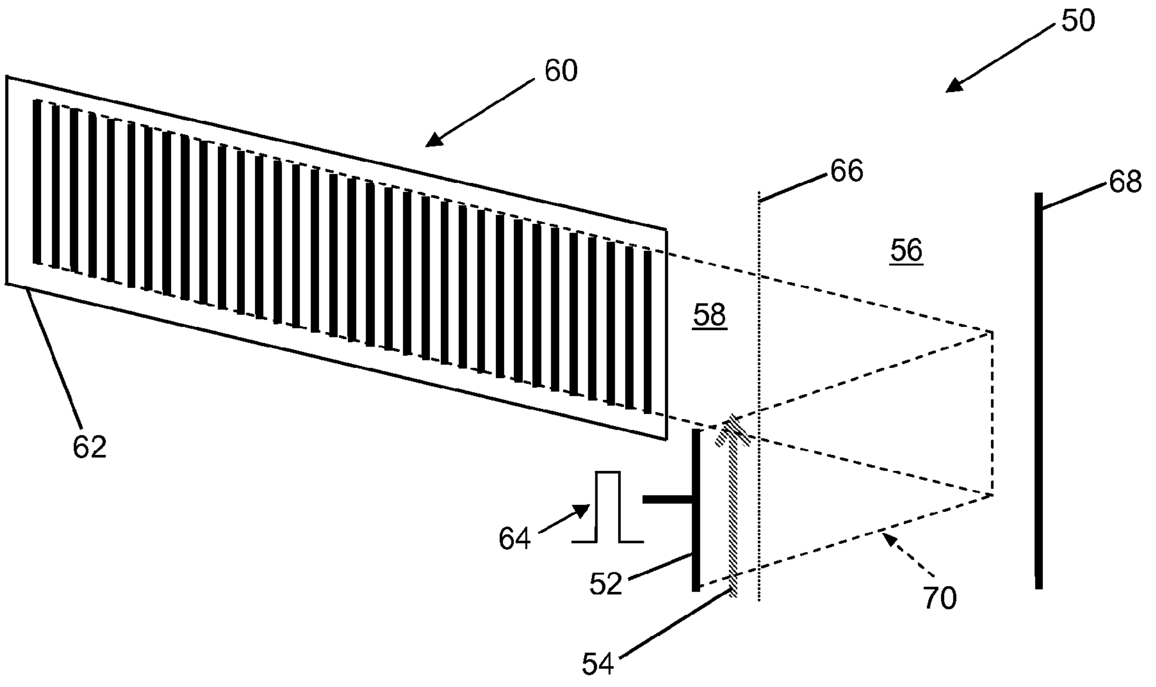
FIG. 9 is an embodiment in which the ion bunch is a section of an ion beam

The ions 14 in the source region 12 can be either a three-dimensional focused ion bunch or the cross-section of a focused ion beam whose path is orthogonal to the plane of the diagram, as shown in FIG. 9. In the latter case, the ion beam would have a low velocity and the acceleration would be orthogonal to the direction of the ion beam. Beam focusing after constant momentum acceleration may be accomplished by magnetic optics which affects all ions having the same momentum. It is possible then, that using magnetic optics to keep the ion beam focused through the flight parallel to the detector, ions of only one particular charge value would be in focus. For charge-selective observation of ions, the out-of-focus ions may be kept from the flight path by using an aperture. Depending on the forward velocities in the sample beam, the ions may retraverse the source as in FIG. 1B or not, as in FIG. 9.

The detector array 22, also referred to as "array detector", is a series of detectors typically arranged in a linear array. The number of detectors within the linear array may vary depending on the range of m/z values desired. The pitch of the array detectors may also affect resolution along the mass scale.

The array detector may also be a phosphor plate which emits photons when an energetic ion impinges on it. The position and abundance of ion hits can then be recorded by a camera (digital or film) focused on the phosphor plate. Other position-sensitive ion or photon detectors can also be used. Examples may include fluorescent or phosphorescent ion to photon conversion devices, image intensifiers, image detectors, etc.

Each element in the detector array may be connected to an electronic device configured to record the ion intensity, individually or in ensemble (as in a CCD image detection device). The device may be an analog-to-digital converter or an ion event counter. In the case where an ion beam is used, the detector elements may be parallel detector strips with the long dimension of the detector strips aligned in the direction of the ions in the ion beam, as in FIG. 9.

The push plate 24 is configured to apply a push voltage to ions traversing the field-free region. At a detect time or slightly before, the voltage is applied to the ions causing them to land on the detector array.

Additionally, the DOF-MS may include an accelerator grid 32 located in the field-free region 16, between the detector array 22 and the push plate 24. As seen from the schematic, the detector array, the push plate, and the accelerator grid are substantially parallel to each other, and are approximately the same lengths. Alternatively, these components are not necessarily parallel to each other or have the same lengths. For example, in some circumstances where defocusing may be due to the difference in time the ions will take to get to the detector array according to their mass, this error can be eliminated if the push plate is shaped so that it is further from the ion path at the further end of the array detector. This difference in geometry would provide the ions with lower m/z a lower field strength and thus equalize the time of flight to the detector for all the masses.

Figure 1B:
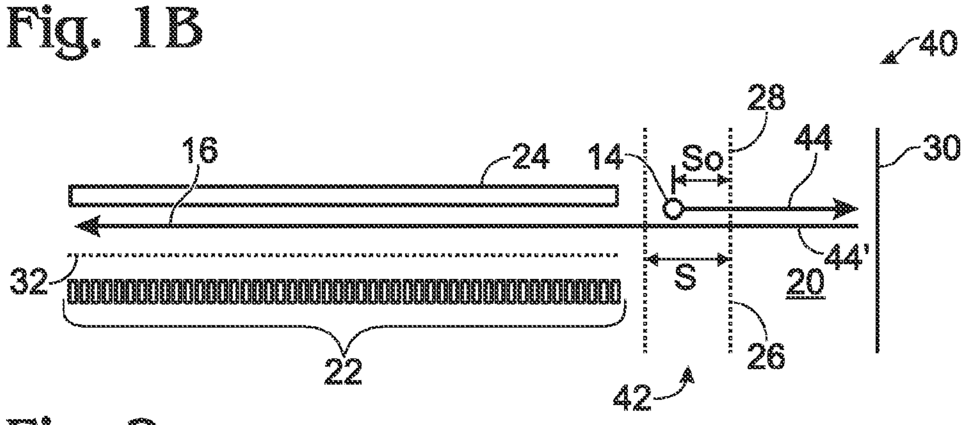
FIG. 1B is a schematic of a DOF-MS in accordance to another embodiment.

Referring to FIG. 1B, a schematic of another embodiment of a DOF-MS is shown at 40. The embodiment of FIG. 1B is similar to that of FIG. 1A, and most components are identically numbered. One of the differences lies in the position of the source region 42, and thus the different starting position of the ions. It follows that the flight paths of the ions before 44 and after 44' reflection from the ion mirror 20 also differs. The ions 14 exit the ion source at 26 and immediately enter the ion mirror 20 through grid 28 where the ions 14 are reflected back through the ion source 42 and into the field-free region 16 where they are pushed to the array detector 22 at a specific time. Prior to leaving ion source 42, the ions may still be given an acceleration pulse for constant momentum extraction.

When the ions 14 re-traverse the ion source 42, the ion source is field-free or contains a time-dependent field to further improve spatial ion focus, energy focus, or both. It should also be noted that in a similar embodiment, the ions 14 do not necessarily re-traverse the ion source 42. As described below in FIG. 9, the ions may enter the ion mirror at an angle relative to the mirror axis and may be reflected by the mirror on a path that does not re-traverse the ion source.

In the exemplary embodiment of FIG. 1B, the DOF-MS can accommodate a longer array detector and thus a wider m/z range. As a note, simulations for this embodiment were created using Excel by in-house macros written in Visual Basic.

With reference to the exemplary embodiments of FIGS. 1A and 1B, the discussion of distance of flight using constant momentum extraction and an ion mirror continues. For distance of flight mass spectrometry, the ions will fly in the field-free region until a certain total elapsed time $t_{det}$. The distance they have at that time is their distance of flight $L_{FF}$ which will be their velocity times the time they spend in the field-free region. This includes the distance from the source exit to the mirror entrance in the case of geometry (A) in FIG. 1.

$$L_{FF}=v_p(t_{det}-t_M-t_s) \tag{33}$$

It is expected that this distance will be different for each different m/z value. From the fact that $v_p=v_{imp}+v_o$, and substituting in Equation (33) for $t_M$ and $t_s$ from Equations (27) and (17)

$$L_{FF}=(v_{imp}+v_o)\left(t_{det}-\frac{(v_{imp}+v_o)2m}{zq_eE_M}-\frac{\tau}{2}\right)+\frac{\tau v_o}{2}-(s_o+\Delta s_o) \tag{34}$$

When Equation (34) is partially multiplied out, the result is $$L_{FF}=v_{imp}t_{det}-\frac{2mv_{imp}^2}{zq_eE_M}-(s_o+\Delta s_o)-\frac{\tau v_{imp}}{2}+v_ot_{det}-\frac{4mv_{imp}v_o}{zq_eE_M}-\frac{2mv_o^2}{zq_eE_M} \tag{35}$$

The first two terms in Equation (35) are the basic relationship between distance of flight and m/z. The third term is the initial spatial dispersion unchanged at the flight distance. The last three terms are due to the energy dispersion in the source of which the last term is the least significant.

When Equation (7) is used for $v_{imp}$ and $v_o$ is set to zero, we see that the distance of flight is inversely related to m/z and that the initial spatial dispersion in the source is maintained at the detector array.

$$L_{FF}=\frac{zq_eE_p\tau}{m}\left(t_{det}-\frac{2E_p\tau}{E_M}-\frac{\tau}{2}\right)-(s_o+\Delta s_o)\ (\text{for } v_o=0) \tag{36}$$

The two terms in $v_o$ in Equation (35) are the first order defocusing from the initial ion energy. These can cancel if the detect time is set according to the following equation.

$$t_{det(@\,eft)}=\frac{4mv_{imp}}{zq_eE_M}=\frac{4\tau E_p}{E_M} \tag{37}$$

Thus we see that the detect time for initial energy focus is twice the time the ions with zero initial kinetic energy spend in the mirror (Equation (26)).

The first order focusing detect time is not dependent on m/z which indicates that for this term, all the m/z values will be focused at the same detection time at their respective distances. This detection time can be called the energy focus time. This is the desired effect for distance-of-flight mass spectrometry. The second-order energy defocusing (the last term in Equation (35)) increases with increasing initial ion kinetic energy.

Figure 2:
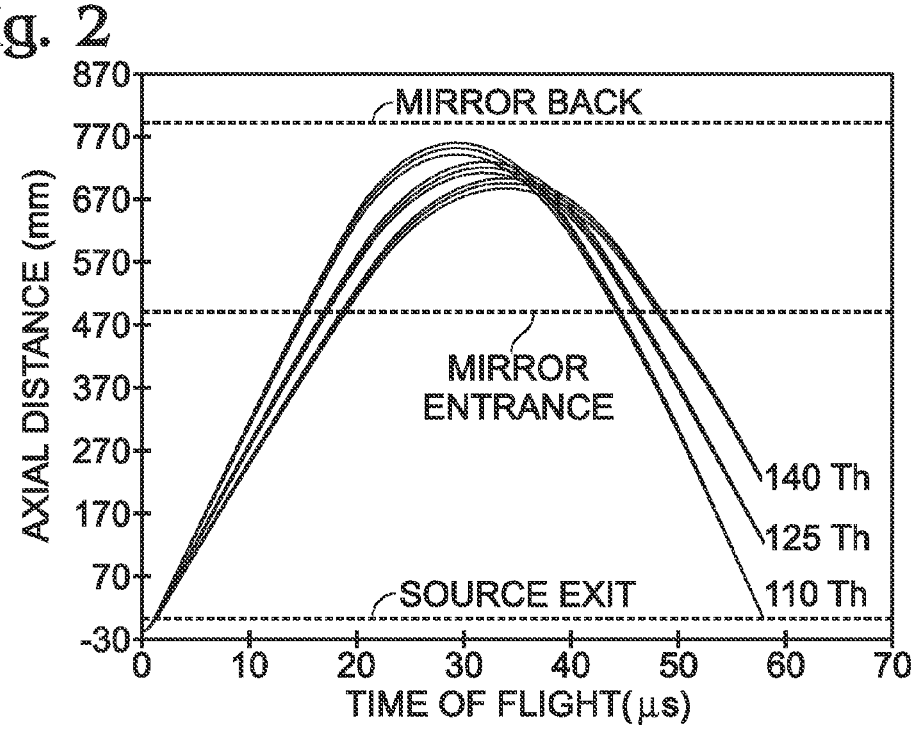
FIG. 2 is a graph of a simulation of trajectories of ions of m/z 110, 125, and 140 in the DOF system of FIG. 1A.

The ion trajectories shown in FIG. 2 were obtained from a SIMION simulation in which s is 25 mm, $s_o$ is 20 mm, $L_M$ is 286 mm, $V_p$ is 1000 V, τ is 100 μs, $V_M$ is 799 V, and the mirror entrance is at a flight distance of 500 mm from the source exit, as depicted in the exemplary embodiment of FIG. 1A. Ions of m/z values of 110, 125, and 140 were used. They had zero initial spatial dispersion, but −0.2, 0, and +0.2 eV of initial kinetic energy. From this plot, one can see that the ions with forward kinetic energy arrive at the mirror sooner, proceed into the mirror further and exit the mirror later than those with zero or reverse kinetic energy. These ions are refocused at a particular flight distance and time. The energy focus time, as predicted by Equation (37) and demonstrated by simulation, is 57.2716 μs for ions of all three m/z values. Thus, energy focus is achieved for all ions at the same time at m/z-dependant distances.

When Equation (37) is substituted for $t_{det}$ in Equation (35), Equation (7) is used for $v_{imp}$ in some terms and Equation (8) is used for $v_o^2$, $$L_{FF(@\,eft)} = \frac{zq_eE_p\tau}{m}\left(\frac{2L_ME_p\tau}{V_M} - \frac{\tau}{2}\right) - (s_o + \Delta s_o) - \frac{4|U_o|}{zq_eE_M} \tag{38}$$

The first term in Equation (38) is the basic relationship between the flight distance and the m/z value of the ions at the energy focus time. The m/z dispersion factor is comprised entirely of constant operating parameters and may, therefore, be varied by them. The third term is the second order defocusing due to initial ion energy and is toward shorter flight distances regardless of the direction of the initial ion velocity. As mentioned before, the initial spatial dispersion of ions is maintained everywhere along the flight path and, for gaseous low initial kinetic energy ions, is likely to be the limiting factor in mass resolution. The space and energy defocusing terms are mass independent so the relative resolution will decrease as mass increases because of the increased crowding of the mass scale at higher masses. As shown later, the peaks for ions of the same mass with successive multiple charges will be equally spaced along the distance axis with the spacing dependent on mass.

Comparing the various combinations of constant energy and constant momentum extraction and time-of-flight and distance-of-flight detection, one sees that TOF detection is best suited to constant energy extraction and that the ion mirror provides spatial focus at a reasonable flight distance. However, the energy variation and the ion turn-around time remain the principal limitations to temporal focus at the detector. On the other hand, distance-of-flight detection is best served by constant momentum extraction for which the ion mirror can provide first-order energy correction but this approach provides no correction for the spatial dispersion in the source.

Practical Experimental Values and Achievable Performance

As described above, a distance-of-flight mass spectrometry with energy focusing by an ion mirror is shown in FIGS. 1A and 1B. In the depicted exemplary embodiment, ions are given a constant momentum pulse out of the source, fly through a field-free region to the ion mirror (FIG. 1A) or directly enter the ion mirror (FIG. 1B) and, on exit from a mirror, fly parallel to a linear array detector. First consider the conditions that are necessary to make sure all the ions are in the source at the end of the acceleration pulse. Start with equation (12) for the distance remaining in the source at the end of the pulse. The applied pulse must be such that this distance will not be less than zero. The worst case condition is for the ion with the lowest m/z, the location closest to the source exit and with internal energy toward the exit. Thus $$s_o - \Delta s_o - \frac{zq_eE_p\tau^2}{m} - \tau v_o = 0 \text{ (for ion with smallest } m/z) \tag{39}$$

When Equation (39) is solved for $E_p$, $$E_{p(max)} = \frac{2m(s_o - \Delta s_o - \tau v_o)}{zq_e\tau^2} \text{ (for ion with smallest } m/z) \tag{40}$$

This equation allows one to use the maximum pulse voltage for a given pulse width. As will be shown, a larger imparted momentum provides a better level of energy focus. To be on the safe side, a value of 99% of that calculated from Equation (40) could be used. This percentage may be higher or lower, and may depend on how big or small the value of the smallest m/z turns out to be.

Ions given constant momentum acceleration have a kinetic energy that is highly dependent on their m/z value, ions with a lower m/z having a higher kinetic energy as well as a higher velocity. The voltage $V_M$ at the mirror back must be higher than the kinetic energy over z (in eV) of the lowest value of m/z that one wants to detect. These same lowest value m/z ions should fall at or near the most distant detector in the array. Meeting these criteria poses some constraints on the values of the parameters in Equation (38). Let us assume that the value of $V_M$ should be 1.1 times $ke_p/z$ of the lowest value of m/z among the ions of interest. Note that $V_M$ may be as low as 1 times $ke_p/z$ of the lowest value of m/z among the ions of interest or alternatively, it may be a greater than 1.1 multiple. This puts the turn-around of the most energetic ions near, but not at or beyond the back of the mirror. The kinetic energy of these ions (ignoring spatial and energetic variations) is a modification of Equation (9).

$$ke_{p,max,eV} = \frac{(E_p\tau)^2z^2q_e}{2m}\begin{pmatrix}\text{for ion with smallest } m/z,\\ \text{ignoring } U_o \text{ and } \Delta s_o\end{pmatrix} \tag{41}$$

Equation (38) is similarly modified (using $V_M/L_M$ for $E_M$) to give $$L_{FFmax} = \frac{zq_eE_p\tau}{m}\left(\frac{2E_pL_M\tau}{V_M} - \frac{\tau}{2}\right)\begin{pmatrix}\text{for ion with smallest } m/z,\\ \text{ignoring } U_o \text{ and } \Delta s_o\end{pmatrix} \tag{42}$$

Now $V_M$ is set to be equal to 1.1 times the $ke_p/z$ of the ions with the smallest value of m/z in Equation (41).

$$\begin{aligned} V_{M(min)} &= \frac{E_{M(min)}}{L_M} \\ &= \frac{1.1(E_p\tau)^2zq_e}{2m} \text{ (for ion with smallest } m/z) \end{aligned} \tag{43}$$

When Equation (43) is substituted for $V_M$ in Equation (42), $$L_{FFmax} = \frac{4L_M}{1.1} - \frac{v_{imp}\tau}{2}\begin{pmatrix}\text{for ion with smallest } m/z,\\ \text{ignoring } U_o \text{ and } \Delta s_o\end{pmatrix} \tag{44}$$

where $L_{FFmax}$ is the field free flight distance of the furthest detector. The second term in Equation (44) is approximately the distance flown in the source during the pulse for the ion with the smallest m/z which we will also assume is nearly the value of $s_o$. On this basis, the value for the mirror depth is calculated to be $$L_M = \frac{1.1}{4}(L_{FFmax} + s_o) \quad (45)$$

Now, in such a system, the value of m/z that occurs at $L_{FFmax}$ is set by the ratio $(E_p\tau)^2/V_M$ as shown in Equation (42).

Ions of higher m/z value are detected at distances that are a fraction of $L_{FFmax}$ according to $$\frac{L_{FF}}{L_{FFmax}} = \frac{z}{m}\frac{m_{min}}{z_{min}} = \frac{\mathrm{z}}{\mathrm{m}}\frac{\mathrm{m}_{min}}{\mathrm{z}_{min}} \quad (46)$$

Roman m and z are used in the last term of Equation 46 rather than italic to denote that atomic mass values can be used in this equation as all the conversion constants cancel out.

Figure 3:
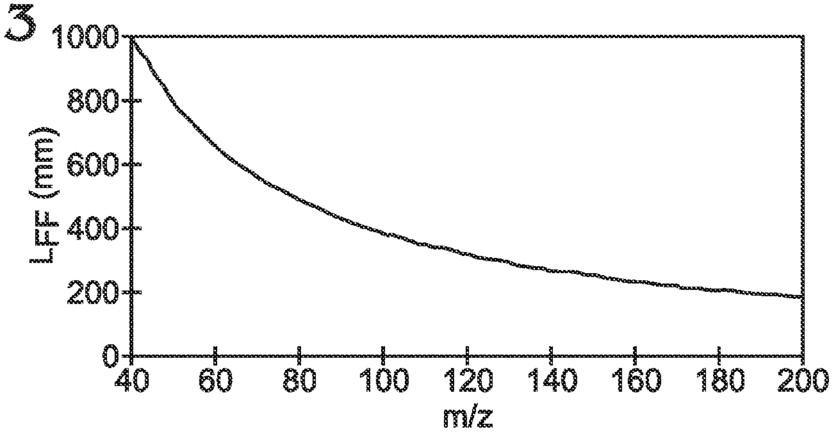
FIG. 3 is a plot of the flight distance of ions vs. m/z of ions for the m/z range 40 to 200.

In one exemplary embodiment, a system for which $L_{FFmax}$ is 1 m and $L_M$ is 0.286 m has been modeled with our Excel simulation program. It was assumed that the source has a depth (s) of 25 mm and that $s_o$ is 20 mm from the source exit. FIG. 3 is a plot of the distance of flight vs. m/z for the case when $(m/z)_{min}$ has been set to 40. The reciprocal relationship of the distance of detection and the m/z value is apparent. The points plotted are given in Table I along with other data on the ion flight. The velocity imparted by the extraction impulse is $v_{imp}$, the ion position at the end of the pulse is $s_p$ m away from the source exit. This number must be positive to indicate that the ion was still in the source at the cessation of the pulse. The ion kinetic energy is seen to decrease with increasing m/z as expected.

For distance of flight mass spectrometry, the resolution is given by $L_{FF}/\Delta L_{FF}$. Two values of mass resolution are calculated using the maximum dispersion of $L_{FF}$ for the energy and spatial dispersions used in the simulation. One resolution calculation considers only the energy dispersion and the other the combination of the energy and spatial dispersion at the detector. For the latter, it was assumed that $\Delta s_o$ is ±0.5 mm. Unit resolution is obtained throughout the m/z range from 40 to 175. Note that if the ions in the source are contained within the boundaries of ±0.5 mm and 0.2 eV of energy, the resolutions given will be baseline. If the ions are thermalized to 25° C., the fraction of ions having an energy greater than 0.2 eV, according to the Maxwell-Boltzmann distribution is 4.2×$10^{-3}$. It is also apparent that it is the spatial dispersion that is the limiting factor since the resolution considering only energy dispersion is in the thousands. Such an instrument could find application in elemental analysis.

Referring to FIG. 3 and Table I (below), the following data set was used to plot data points for FIG. 3 showing flight distance in mm vs. m/z of ions. The time of detection was 27.427 microseconds and the dispersion at the detector due to the initial spread in energy and direction of the ions was 0.174 mm. The columns "e res" and "e,s res" give the baseline mass resolution for initial energy dispersion only and both energy and spatial dispersion. The full initial spatial spread was assumed to be ±0.5 mm and the maximum initial energy spread, 0.2 eV in both directions. Unit baseline resolution is achieved to m/z 175. A 1,572 V pulse was applied across the 2.5 cm source for 0.5 μs. The mirror voltage was 1,311 V and the detection time was 27.427 μs.

TABLE 1

| m/z | $v_o$, at $U_o$ mm/μs | $v_{imp}$, m/s | $S_p$, mm | $t_s$, μs | $ke_p$, eV | $L_{FF}$, mm | e res | e, s res |
|---|---|---|---|---|---|---|---|---|
| 40 | 0.9823 | 75.8375 | 1.0406 | 0.51373 | 1192.17 | 1001.041 | 5730 | 852 |
| 50 | 0.8786 | 60.6700 | 4.8325 | 0.57966 | 953.73 | 796.8325 | 4570 | 678 |
| 60 | 0.8020 | 50.5583 | 7.3604 | 0.64559 | 794.78 | 660.6937 | 3795 | 563 |
| 70 | 0.7425 | 43.3357 | 9.1661 | 0.71152 | 681.24 | 563.4518 | 3232 | 480 |
| 80 | 0.6946 | 37.9188 | 10.5203 | 0.77745 | 596.08 | 490.5203 | 2811 | 418 |
| 90 | 0.6548 | 33.7056 | 11.5736 | 0.84338 | 529.85 | 433.7959 | 2486 | 369 |
| 100 | 0.6212 | 30.3350 | 12.4162 | 0.90931 | 476.87 | 388.4163 | 2226 | 331 |
| 110 | 0.5923 | 27.5773 | 13.1057 | 0.97524 | 433.51 | 351.2875 | 2013 | 299 |
| 120 | 0.5671 | 25.2792 | 13.6802 | 1.04117 | 397.39 | 320.3469 | 1837 | 273 |
| 130 | 0.5449 | 23.3346 | 14.1663 | 1.1071 | 366.82 | 294.1664 | 1686 | 250 |
| 140 | 0.5250 | 21.6679 | 14.5830 | 1.17303 | 340.62 | 271.726 | 1557 | 231 |
| 150 | 0.5072 | 20.2233 | 14.9442 | 1.23896 | 317.91 | 252.2776 | 1446 | 215 |
| 160 | 0.4911 | 18.9594 | 15.2602 | 1.30489 | 298.04 | 235.2602 | 1348 | 200 |
| 170 | 0.4765 | 17.8441 | 15.5390 | 1.37082 | 280.51 | 220.2449 | 1262 | 188 |
| 180 | 0.4630 | 16.8528 | 15.7868 | 1.43675 | 264.93 | 206.898 | 1186 | 176 |
| 190 | 0.4507 | 15.9658 | 16.0086 | 1.50268 | 250.98 | 194.956 | 1117 | 166 |
| 200 | 0.4393 | 15.1675 | 16.2081 | 1.56861 | 238.43 | 184.2082 | 1056 | 157 |

Figure 4:
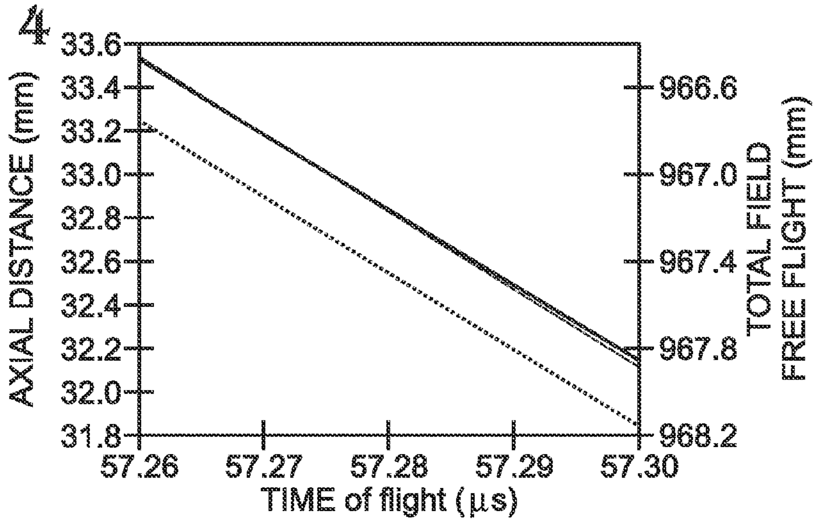
FIG. 4 shows a magnification of FIG. 2 in the focus region for ions of m/z 110.

Turning now to FIG. 4, a magnification of ions of m/z 110 from FIG. 2 in the focus region is shown. This SIMION simulation confirms the results of the Excel simulation in FIG. 3 in that, at the energy focus time, the ions with initial forward and reverse kinetic energy are focused at a distance forward of that of the zero kinetic energy ion, or in other words, they are lagging. The dispersion of 0.28 mm at the energy focus time and the focus time of 57.2716 μs are both confirmed when the same parameters are used with the excel simulation program. The fact that the flight distances of ions of a given m/z value with forward and/or reverse initial kinetic energies will be somewhat dependent on the initial kinetic energy indicates that the centroid of flight distance for ions and that the peak shape may be useful in determining the initial ion kinetic energy distribution. The peak profile at this time will appear at distances between the lines of zero and 0.2 eV kinetic energy.

Figure 5:
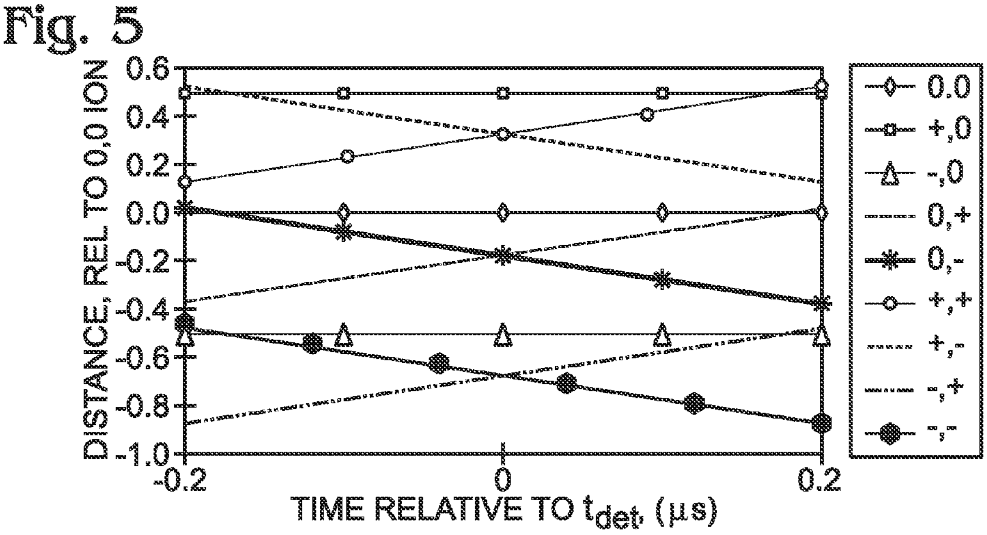
FIG. 5 is plot of the relative positions of ions of m/z 40 at times just before and after the detect time.

FIG. 5 shows the relative positions of ions of m/z 40 at times 0.1 μs just before and after the detect time (0.0 μs) with the conditions used in Table I. The nine ion trajectories correspond to ions that have 0.5 mm forward (+), reverse (−), and zero deviations (0) from the starting position of $s_o$ (as the first symbol), and have 0.2 eV forward (+), reverse (−), and zero initial kinetic energy (0) (as the second symbol). For demonstration of the energy focus effect, their plotted position is that relative to that of the 0,0 ion at each flight time. These ion positions were obtained with the Excel numerical integration program carrying the ions through the ion source and ion mirror and then simple time, velocity, distance formulae for the field-free region. From this figure, the energy focus for each of three initial ion positions is apparent. The dispersion at the focal point matches that calculated from the last term in Equation (38). This plot also confirms that the ions with both positive and negative initial energy appear at flight distances less than ions with zero initial kinetic energy. Similar plots for ions of all higher m/z values show the energy focus at the same detection time.

Figure 6:
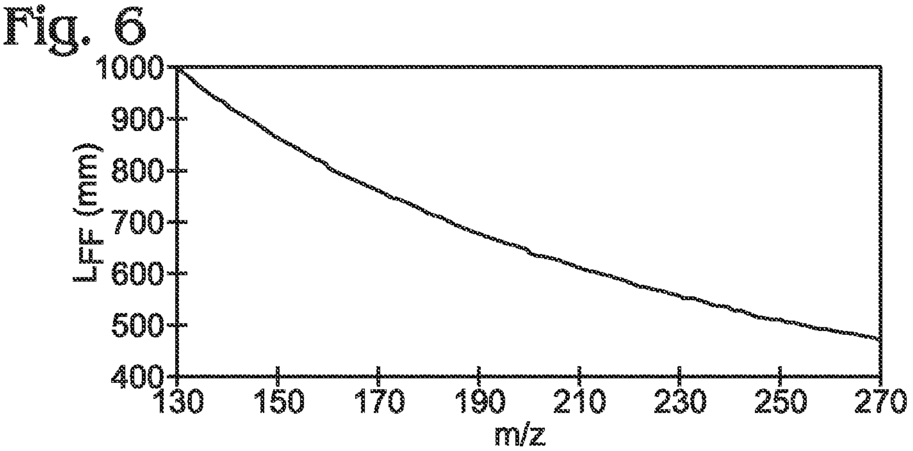
FIG. 6 is a plot of the flight distance vs. m/z of ions, minimum m/z of 130 Th.

Referring to FIG. 6, the mass/distance calibration plot is shown. When the minimum m/z value is increased to 130 (by changing $V_M$ to 1060.08 V) and the resolution is optimized by maximizing $E_p\tau^2$ with $V_p$ of 1274 V and $\tau$=1 μs, the m/z range for detector positions from 470 to 1000 mm covers the mass range from 130 and 270. The resolution values with an initial spatial dispersion of ±0.5 mm and a thermal energy of 0.2 eV are 813 for m/z 130 (0.16 mass units) and 380 for m/z 270 (0.71 mass units). Thus, resolution of less than 1 Th is maintained throughout this region with an initial spatial dispersion of 1 mm and an initial thermal energy of 0.2 eV. With no initial spatial spread, these figures would be 5962 and 2522. Thus all m/z values will be better than base-line resolved. The limiting resolution based on the second order energy defocusing alone is in the thousands. Such a parameter set could be useful for isotopic analysis of the elements from Cs through the actinides.

The quantity $E_p\tau^2$ determines the length of ion movement in the source during the acceleration pulse for a given m/z. Holding that quantity constant while increasing the field strength and correspondingly reducing the pulse duration improves the energy focus. Under the same conditions as FIG. 2 and Table 1, but with the pulse voltage decreased to 386 V and the pulse width increased to 1 μs, the dispersion due to the initial energy is increased from 0.174 mm to 0.723 mm and the resolution considering energy only is reduced from 5730 to 1385. The resolution considering both energy and spatial dispersion is less affected as it is dominated by the spatial effect for the 1 mm ion spread chosen.

Figure 7:
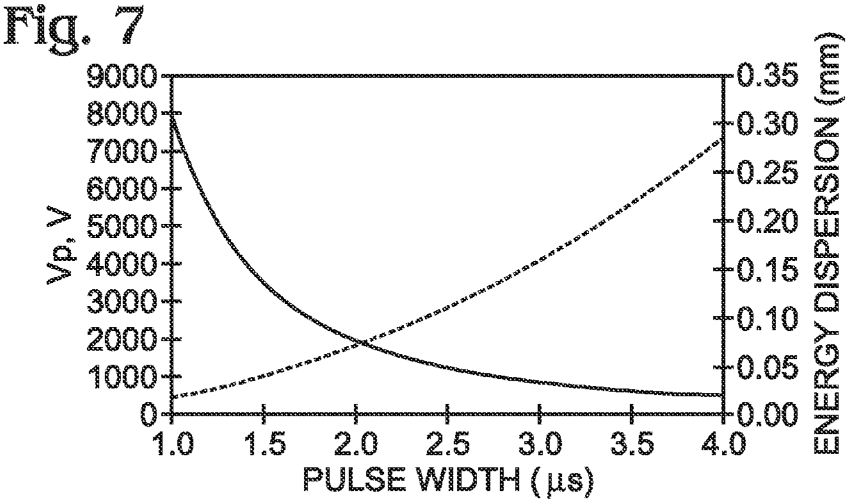
FIG. 7 is a plot of the relationship between maximum pulse voltage and pulse width, m/z of 800 and the corresponding dispersion due to initial energy at the detector.

Another m/z range of interest is that produced by electrospray ionization. Calculations of performance have been done for the case with m=800 and z=1. Referring to FIG. 7, the values of pulse voltage for various pulse widths (for a source depth of 25 mm and a maximum detector distance of 1 m) are plotted. The energy dispersion of ions at the detector, in mm, for ions with zero to 0.2 eV initial kinetic energy are also plotted. As discussed above, the energy dispersion decreases with increasing acceleration field strength or, for a constant $E_p\tau^2$, increases as the square of the pulse width. There will be a practical limit based on the electronics of the source pulser. As non-limiting examples, pulse voltages may be selected from the ranges including: i) 0-1000 V; ii) 1000-2000 V; iii) 2000-3000 V; iv) 3000-4000 V; v) 4000-5000 V; vi) 5000-6000 V; vii) 6000-7000 V; viii) 7000-8000 V; ix) 8000-9000 V; x) 9000-10000 V; xi) 10000-11000 V. The selected pulse voltage may be chosen inversely proportionally to the pulse width, which may be selected from the following group: i) 0.1-0.5 μs; ii) 0.5-1.0 μs; iii) 1.0-1.5 μs; iv) 1.5-2.0 μs; v) 2.0-2.5 μs; vi) 2.5-3.0 μs; vii) 3.0-3.5 s; viii) 3.5-4.0 μs; ix) 4.0-4.5 μs; x) greater than 4.5 μs. The other extreme may occur where the longer pulse widths enable the use of lower voltage pulses, but the second order dispersion due to initial kinetic energy increases as the square of the pulse width.

However, it is important to note that the pulse shape is not critical as long as it is over before the ions have left the source. For example, pulses may be any shape: peaked, initially high, then decreasing, stepped, sawtooth, etc. It is the area under the voltage-time curve that performs the constant momentum acceleration and this could have any shape. As a non-limiting example, FIG. 7 shows an exemplary voltage-time curve. As discussed in U.S. Provisional Patent Application No. 60/848,745, entitled "Method of Focusing Ions for Distance of Flight Mass Spectrometry" filed Oct. 2, 2006, hereby incorporated by reference, a shaped acceleration voltage may be applied across the source region. A time-variant voltage may be applied such that the slower (higher m/z) ions still in the source experience a different acceleration from those that left the source earlier. Another possibility, in which all the ions experience the same fields is to apply a short acceleration pulse followed by a constant acceleration voltage of a different value. If the acceleration pulse is so short that all the ions are still in the source when it is over, the ions have been given a constant momentum in the direction of the pulse acceleration and ions of different mass will be moved to different positions in the source.

Returning to FIG. 7, we can conclude that a pulse shape that is high at the onset will provide the highest degree of energy focusing. If there were no spatial dispersion, the resolution at mass 800 Th would be greater than 11,000 and at mass 2000 Th, almost 7,000 at a detector distance of 389 mm and a detection time of 82.2 μs. If the spatial dispersion were 1 mm total and the field-free distance to the farthest detector were 1 m, the overall baseline resolution approaches 1 m/1 mm=1000. Clearly working to improve an energy focus dimension that is already small compared to the space focus dimension is not productive. On the other hand, working to improve the space focus over the time of acceleration will improve overall resolution.

The effect of ion charge on the flight distance at the energy focus time is of particular interest in the electrospray m/z range. An inspection of Equation (38) reveals that the flight distance at the energy focus time is proportional to the ion charge and that the spacing between adjacent charge numbers will be $$\Delta L_{FF,\Delta z=1} = \frac{q_e E_p \tau}{m}\left(\frac{2L_M E_p \tau}{V_M} - \frac{\tau}{2}\right) \tag{47}$$

Figure 8:
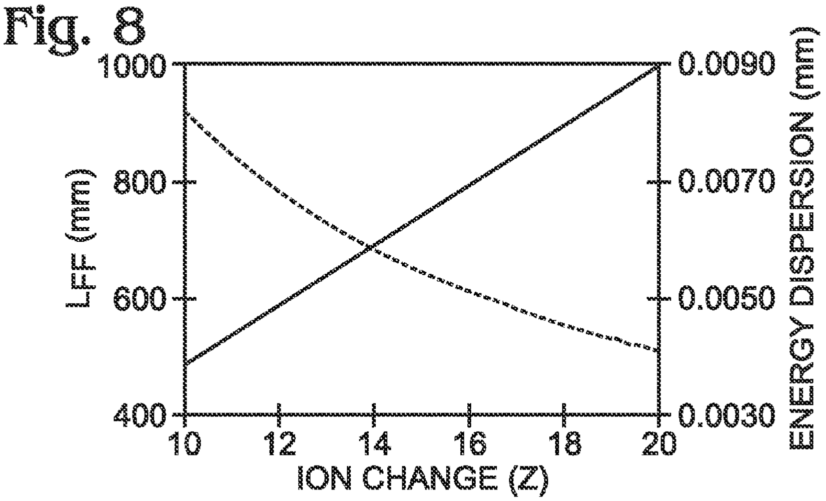
FIG. 8 is a plot of flight distance vs. z for ions of m=15,000 also showing the decrease in dispersion due to initial energy as the charge increases.

FIG. 8 demonstrates the linear relationship between flight distance at the energy focus time and ion charge number, where m=15,000. All the terms in Equation (47) are known constants except m so from the spacing of regularly spaced peaks (on the distance scale, not the m/z scale), and from the calculated value of m/z, both the mass and the charge can be calculated. As with normal mass spectrometry, the mass values of peaks of the same massed ions can be averaged for improved mass accuracy. In the DOF-MS case, the mass and charge interpretation algorithm would start by identifying sets of peaks that were regularly spaced on the distance axis.

The second order energy defocus in the last term of Equation (38) is dependent on the ion charge. The simulation results plotted in FIG. 8 show that the absolute dispersion due to charge decreases with increasing charge as predicted. The dispersion shown in FIG. 8, with the square data points on the right axis, is for ions with ±0.2 eV of kinetic energy which, for ions that are collisionally cooled to room temperature, would include 99.5% of the ions. This is seen to be independent of charge. These data points were obtained with the Excel simulation program.

If the array detector elements are charge-based detectors, there is physically no upper limit to the m/z value of ions that could be separated and detected by this approach. To illustrate, calculations were performed for a minimum m/z of 100,000. In one exemplary embodiment, an energy dispersion resolution of 73,000 is predicted at m/z 100,000 with a pulse voltage of 9,933 V and a pulse width of 10 μs. The overall resolution is still limited by the initial spatial resolution unless that could be brought to the order of 0.014 mm. Laser desorption may be used in conjunction with distance-of-flight mass analysis. Constant momentum acceleration of ions generated by MALDI has already been demonstrated (Short, R. T.; Todd, P. J. *J. Am. Soc. Mass Spectrom.* 1994, 5, 779-787).

The energy focus resolution could be made still higher with a larger pulse voltage, but 10,000 V is already at the higher end of affordable technology, which may change in the future. Observation of the simulation calculations indicates that for the exemplary embodiment chosen, the ions set to fall on the farthest detector have approximately the same velocity of approximately 19,000 m/s. For higher m/z ions to reach this velocity, a larger voltage-time combination may be used.

Driving the Ion Beam to the Detector

Referring to FIG. 9, a top view schematic of a DOF-MS in accordance with an alternate embodiment is shown at 50. A section of an ion beam 54 having forward parallel to the mirror entrance plane is accelerated into an ion mirror 56 which reflects the ion beam into a field-free region 58. When the ion beam arrives in the vicinity of a detector array 60, a detection pulse (also referred to as "push pulse") is applied to a push plate 62 to drive the ions to the detector array 60. In this embodiment, the detector array includes charge detectors arranged in parallel.

The element 52 applies a momentum acceleration pulse 64 to the ion beam 54. The pulse characteristics may be ones similar to those mentioned in the previous embodiments. It should be noted that the ion beam may be emitted directly into the ion mirror, or alternatively, it may traverse a field-free region before entering the ion mirror. The ion mirror includes a front entrance grid 66 and a back 68 where a voltage may be applied.

The dashed lines show an example of the path 70 of the ion beam. The ion beam may deviate from the path as shown. For example, the ion beam may traverse deeper into the ion mirror before it is reflected or at a different angle into the mirror. In this embodiment, the ion beam does not re-traverse the ion source. It is also possible to overlap the ion beam extractions, that is, start another extraction while the previous set of extractions is still in the mirror.

The ion beam going parallel to the array detector is expected to have a finite dispersion of ions vertically above the plane of the detector array (also referred to as "detector plane"). The application of a constant energy push voltage to the push plate will drive the ions in this beam toward the detector. Ions beginning from the same flight distance but from a different vertical distance from the detector plane, can be made to land at the same detector element by simply locating the detector plane at the space focus plane for that push geometry. Ions of the same m/z arrive at the space focus plane at the same time after the push pulse (for example, lower m/z ions fly further). During that time, they will have flown very nearly the same horizontal distance so their vertical dispersion will not affect their horizontal flight distance at the detector plane.

The flight time to the detector after the push pulse is given by Equation (3). The time of the orthogonal push pulse should be adjusted to take this time into account as it is at the detector that the ions should be at the energy focus time. Therefore, the time of the orthogonal detect pulse should be $$t_{opulse}=t_{det@eft}-t_{SFP} \tag{48}$$

Since $t_{SFP}$ is mass dependent, this condition will not be met for all masses in the detection range simultaneously (assuming a constant geometry for the push plate, acceleration grid and detector across the length of the detector array). However, using the Excel simulations, it is possible to assess the effect of the less than ideal energy focus over the desired mass range.

For the case of the mass range of m/z 40 to 200 as in FIG. 3 and Table I, and assuming an orthogonal push pulse of 5,000 V across a 1 cm source depth with the ion beam centered in the middle, the value of $t_{SFP}$ varies from 0.0576 μs for m/z 40 to 0.129 μs for m/z 200. If the time of the orthogonal pulse is set so that the m/z 110 ions arrive at their detector element at the energy focus time, the m/z 40 ions will have flown past their energy focus time by 0.0379 μs and the m/z 200 ions will be short of their energy focus time by 0.0333 μs. The degree of defocus of the m/z 40 and m/z 200 ions under these conditions has been simulated. At the energy focus time, the ions in Table 1 all have a second order energy dispersion of 0.174 mm. At the detector elements, the dispersion of the m/z 40, 110, and 200 ions are 0.3913, 0.174, and 0.262 mm, respectively. The mass resolutions at these m/z values for the energy defocus alone are 2558, 2017 and 702, respectively.

Calibration of the ion m/z that will impinge on a given detector element will be distorted somewhat from equation (38) by the fact that the ions are being detected at a time that is slightly different from the energy focus time. This effect is reproducible and quantifiable and should pose no problem in application.

These calculations indicate that the errors due to the mass-dependent orthogonal extraction to the detector plane are real, but relatively minor, especially if there is significant initial spatial dispersion of the ions. The degree of the effect is decreased with increasing orthogonal extraction field strength and longer energy focus detection times. There are ways to alter the detector region geometry so as to eliminate the orthogonal flight time differences and the calibration distortions altogether.

Advantages over time-of-flight are that integration of the signal in the detector could offer improved signal to-noise and increased dynamic range over the fast analog-to-digital converters or ion event counters used in TOF instruments. If the detector were an array of Faraday detectors, the DOF approach would be useful for isotopic analyzers.

It is also possible to perform simultaneous structural analysis by MS/MS of different mass/charge values and this has a very wide range of applications, for example, small molecule analysis of a complex mixture containing four different compounds with different mass/charge values. Monitoring of many compounds with different mass/charge values that cannot be adequately separated by a chromatography method could be undertaken using 2D MS/MS methodology such as Distance of Flight-Time of Flight MS/MS or Distance of Flight-Distance of Flight MS/MS. One or more embodiments may be used in conjunction with this methodology.

Various specific exemplary embodiments are described herein. However, it should be appreciated that actual dimensions and ranges may vary, according to the requirements of the specific apparatus being used and the goals therefore. For example, in some instances, assumptions were made for values, and equations and solutions resulted. However, the assumptions themselves may incorporate a range of acceptable values which in turn lead to different equations and solutions, all of which may be within the scope of the invention. Accordingly, such descriptions should be viewed as exemplary and no limitation inferred unless specifically recited in the claim.

What is claimed is:

1. A mass spectrometer comprising:

an ion source configured to apply an acceleration pulse to ions;

one or more field-free regions through which ions can travel;

a detector array configured to detect ions;

a push plate oriented substantially parallel to the ion path and to the array of detectors and configured to push the ions to the detector array; and an ion mirror configured to reflect ions.

2. The mass spectrometer of claim 1 wherein the ions are reflected off the ion mirror at a substantially 180 degree angle.

3. The mass spectrometer of claim 1 wherein the field-free region containing the push plate and array detector is located in between the ion source and the mirror.

4. The mass spectrometer of claim 1 wherein the field-free region containing the push plate and array detector is not between the ion source and the mirror.

5. The mass spectrometer of claim 1 further comprises a means for applying a voltage pulse to the push plate in order to push the ions in the field-free region to the detector array a specific time after the acceleration pulse.

6. The mass spectrometer of claim 1 wherein the acceleration pulse is a shaped acceleration voltage applied over a source region.

7. The mass spectrometer of claim 1 wherein the ion source is configured to apply constant momentum acceleration by applying an acceleration pulse that has a duration that is shorter than the time it takes for an ion of interest to exit the ion source.

8. The mass spectrometer of claim 1 wherein the ions exit the ion source and immediately enter the ion mirror, reflect off the ion mirror, re-traverse the source, and enter into the field-free region.

9. The mass spectrometer of claim 1 wherein the ions are initially focused to a cross-section of an ion beam.

10. The mass spectrometer of claim 1 wherein the ions are initially created at or near a 2-dimensional surface prior to or coincident with the time of acceleration.

11. The mass spectrometer of claim 1 wherein the detector array comprises at least one of a charge-based detector, fluorescent or phosphorescent ion to photon conversion device, image intensifier, or image detector.

12. The mass spectrometer of claim 1 wherein the mass spectrometer is a distance-of-flight mass spectrometer.

13. A method of focusing ions comprising:

applying constant momentum acceleration at an ion source for extraction;

extracting the ions;

sending the ions to an ion mirror configured to reflect ions;

allowing the ions to traverse a field-free region; and applying a voltage to a push plate in the field-free region to push the ions to a detector array.

14. The method of claim 13 wherein applying constant momentum acceleration comprises applying a shaped acceleration voltage.

15. The method of claim 14 wherein the shaped acceleration voltage is high at the onset and provides a high degree of energy focusing.

16. The method of claim 14 wherein the shaped acceleration voltage is any shape as long as application of the shaped acceleration voltage ceases before any ions of interest exit the ion source.

17. The method of claim 13 wherein applying constant momentum acceleration comprises applying a short acceleration pulse followed by a constant acceleration voltage of a different value.

18. The method of claim 13 wherein applying constant momentum acceleration comprises moving ions of different masses to different positions in the ion source.

19. The method of claim 13 wherein applying constant momentum acceleration comprises applying a time-variant voltage such that the slower (higher m/z) ions still in the ion source experience a different acceleration from those that left the ion source b before the cessation of the acceleration pulse.

* * * * *